Figure 1:
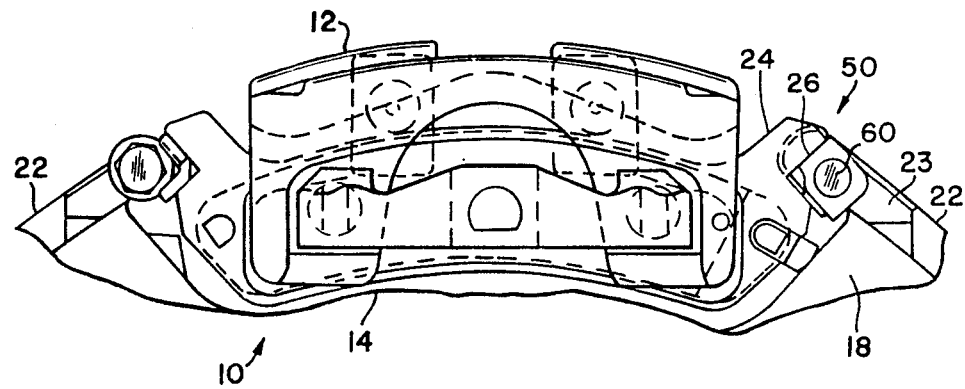

United States Patent [19]

Cartwright et al.

[11] Patent Number: 4,969,540
[45] Date of Patent: Nov. 13, 1990

[54] CENTER LOOP ANTI-RATTLE SPRING

[75] Inventors: Mark A. Cartwright, South Bend; Scott A. Schafer, Osceola, both of Ind.

[73] Assignee: Allied-Signal Inc., Morristown, N.J.

[21] Appl. No.: 413,890

[22] Filed: Sep. 28, 1989

[51] Int. Cl.⁵ .............................................. F16D 65/38
[52] U.S. Cl. ............................... 188/73.36; 188/73.38; 192/30 V
[58] Field of Search ............... 188/73.35, 73.36, 73.37, 188/73.38, 205 A; 192/30 V

[56] References Cited

U.S. PATENT DOCUMENTS

| | | | |
|---|---|---|---|
| 3,612,226 | 10/1971 | Pauwels | 188/73.3 |
| 3,625,314 | 12/1971 | Rinker | 188/73.35 |
| 3,638,765 | 2/1972 | Flaherty et al. | 188/73.5 |
| 3,831,717 | 8/1974 | Flaherty | 188/73.35 |
| 4,134,477 | 1/1979 | Asquith | 188/73.36 |
| 4,180,148 | 12/1979 | Souma | 188/73.5 |
| 4,196,794 | 4/1980 | Matsumoto | 188/73.5 |
| 4,243,123 | 1/1981 | Watanabe | 188/73.5 |
| 4,360,081 | 11/1982 | Ito et al. | 188/73.38 |
| 4,371,060 | 2/1983 | Iwata | 188/73.38 |
| 4,408,681 | 10/1983 | Oshima | 188/73.38 |
| 4,506,767 | 3/1985 | Inoue et al. | 188/73.38 |
| 4,512,446 | 4/1985 | Chuwman et al. | 188/73.38 |
| 4,607,728 | 8/1986 | Kobayashi | 188/73.38 |
| 4,699,254 | 10/1987 | Mery | 188/73.36 |

FOREIGN PATENT DOCUMENTS 52-74774   6/1977   Japan .
58-146730  1/1983   Japan .
58-146731  1/1983   Japan .

Primary Examiner—Matthew C. Graham
Attorney, Agent, or Firm—Larry J. Palguta; Ken C. Decker

[57] ABSTRACT

The center loop anti-rattle spring (50) comprises a pad biasing plate (52) which biases disc brake pads radially inwardly to prevent rattling. The pad biasing plate (52) has at one axial edge (55) a loop arm (56) which extends around approximately 270° in order to position an axially extending axial arm (58) orthogonally relative to the pad biasing plate (52). The axial arm (58) extends into circumferentially extending ear members (62) each having an opening (64) for receiving a pin (60) which connects the spring (50) to a torque support member (18). Each ear member (62) extends into a radial retention tab (66) which extends axially under an arm end (22) of the torque support member (18). The pad biasing plate (52) has oppositely disposed corner recessed areas (54) for reception of the radial retention tabs (66). The axial arm (58) includes a center notch (63) for receiving a base portion (57) of the loop arm (56) during manufacture of the spring.

5 Claims, 1 Drawing Sheet

CENTER LOOP ANTI-RATTLE SPRING

The present invention relates generally to an anti-rattle spring for a disc brake, and in particular a center loop anti-rattle spring mounted on a torque support member and biasing brake pads radially inwardly to prevent rattling thereof.

Many anti-rattle springs have been proposed in order to prevent rattling of brake pads in disc brakes. Some springs are disposed between the caliper and pads in order to bias the pads radially inwardly, and other springs are disposed between the torque support member and brake pads, or between the torque support member and the caliper in order to prevent rattling of the caliper. It is desirable to provide a one-piece anti-rattle spring which is easily fabricated and which will withstand braking torque stresses experienced during the useful life of the disc brake. The anti-rattle spring should be able to Provide a sliding surface for the disc brake pads which abut the spring, and at the same time should be able to continuously bias the pads radially inwardly to prevent rattling thereof. The spring should be easily mounted and removed from the torque support member, and be able to withstand braking forces and stresses experienced by the disc brake throughout its life and in the presence of both new and worn disc brake pads.

The present invention provides a solution to the above problems by providing an anti-rattle spring mounted in a disc brake of the type having a stationary torque support member providing support for disc brake pads, the spring comprising an axially extending pad biasing plate which engages a disc brake pad in order to bias the pad into anti-rattle engagement with an oppositally positioned part of the torque support member, the axially extending pad biasing plate having along one axial edge a centrally positioned loop arm which loops around into an axially extending axial arm, the axial arm extending substantially biasing plate and having a the same length as the pad width which extends toward said pad biasing plate wherein said loop arm disposes the axial arm orthogonally relative to said pad biasing plate, the axial arm engaging an axially extending abutment portion of the torque support member, opposite axial ends of said axial arm extending circumferentially into respective ear members which are disposed about opposite axial ends of said torque support member, each ear member having an opening therein for receiving a retention member received at the torque support member, and each ear extending into an axially extending radial retention tab which extends under the opposite axial ends of the torque support member and is disposed substantially parallel to said pad biasing plate when said anti-rattle spring is mounted in said disc brake.

Figure 2:
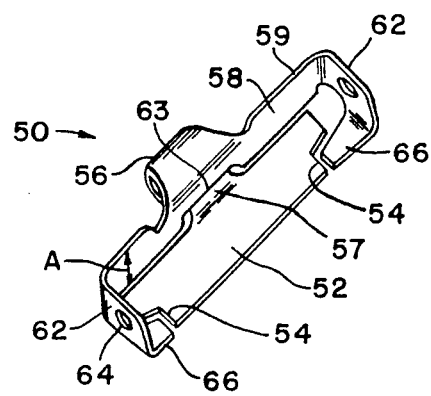

One way of carrying out the invention is described in detail below with reference to the drawings which illustrate a specific embodiment in which:

FIG. 1 is a partial side view of a disc brake including the anti-rattle spring of the present invention; and FIG. 2 is an illustration of the anti-rattle spring of the present invention.

A disc brake utilizing the center loop antirattle spring of the present invention is designated generally by reference numeral 10 in FIG. 1. Disc brake 10 includes a caliper 12 which engages and effects movement of an outer disc brake pad 14. A brake motor (not shown) contains a piston which biases the inner brake pad (not shown) into engagement with the rotor (not shown) so that the caliper 12, by reaction, moves axially and brings the outer disc brake pad 14 into engagement with the opposite side of the rotor. The caliper 12 may be mounted either to a torque support member 18 or supported by the disc brake pads. The disc brake operates to effect braking in the manner well known in the art.

Disposed between arm ends 22 of torque support member 18 is an outer pad plate 24 and an inner pad plate (not shown). Pad plate 24 and the inner pad plate have at least one recess 26 which receives therein a center loop anti-rattle spring 50 in accordance with the present invention. Anti-rattle spring 50 is connected by means of connecting pins 60 to axial end 23 of torque member 18. Referring to FIG. 2, anti-rattle spring 50 comprises an axially extending pad biasing plate 52 which extends axially relative to the disc brake and associated torque support arm end 22. Pad biasing plate has oppositely disposed axial corner recessed areas 54 which are each disposed opposite a longitudinal axial edge 55 which extends into a centrally positioned loop arm 56. Loop arm 56 extends around through approximately 270° into axially extending axial arm 58. Axial arm 58 extends axially along the torque support arm end 22 and is substantially the same axial length as pad biasing plate 52. Axial arm 58 has a width A which extends toward pad biasing plate 52 so that axial arm 58 is disposed orthogonally relative to pad biasing plate 52. At opposite axial ends of arm 58 are oppositely disposed ear members 62. Ear members 62 extend circumferentially relative to the brake and extend over opposite axial ends 23 of arm end 22. Each ear member 62 includes an opening 64 for receiving the associated connecting pin 60. Connecting pin 60 attaches spring 50 to associated arm end 22 of torque support member 18. Each ear member 62 extends into a radial retention tab 66 which extends axially inwardly and is disposed substantially parallel to the pad biasing plate when spring 50 is mounted in disc brake 10. Tabs 66 are designed to be received within the recessed areas 54 when the spring is compressed by the recesses 26 of the inner and outer brake pads. The axial arm 58 includes a center notch 63 along an axial edge 59 opposite loop arm 56 and which can receive a base portion 57 of loop arm 56 when spring 50 is mounted in disc brake 10. When spring 50 is mounted in disc brake 10 such that it is disposed between associated arm end 22 of support member 18 and recesses 26 of the inner and outer pad plates, axial arm 58 is disposed substantially orthogonally relative to pad biasing plate 52 such that retention tabs 66 may be received in recessed areas 54. Center notch 63 prevents axial edge 59 of axial arm 58 from engaging base portion 57 of loop arm 56 during manufacturing.

When spring 50 is mounted in disc brake 10 as illustrated in FIG. 1, the spring is fixed to associated arm end 22 of support member 18 such that pad biasing plate 52 biases radially inwardly the support plates via recesses 26 so that the each of the brake pads will not rattle. Pad biasing plate 52 has a smooth radially inner surface so that the brake pads may slide therealong as they wear during brake usage. Plate 52 biases continuously inwardly the brake pads to eliminate noise between the Pads and arm end 22 of support member 18. Spring 50 is mounted easily to arm end 22, and provides continuous biasing of the brake pads during the useful life of the disc brake.

I claim:

1. An anti-rattle spring mounted in a disc brake of the type having a stationary torque support member providing support for disc brake pads, the spring comprising an axially extending pad biasing plate which engages a disc brake pad in order to bias the pad into anti-rattle engagement with an oppositally positioned part of the torque support member, the axially extending pad biasing plate having along one axial edge a centrally positioned loop arm which loops around into an axially extending axial arm, the axial arm extending substantially the same length as the pad biasing plate and having a width which extends toward said pad biasing plate wherein said loop arm disposes the axial arm orthogonally relative to said pad biasing plate, the axial arm engaging an axially extending abutment portion of the torque support member, opposite axial ends of said axial arm extending circumferentially into respective ear members which are disposed about opposite axial ends of said torque support member, each ear member having an opening therein for receiving a retention member received at the torque support member, and each ear extending into an axially extending radial retention tab which extends under the opposite axial ends of the torque support member and is disposed substantially parallel to said pad biasing plate when said anti-rattle spring is mounted in said disc brake.

2. The anti-rattle spring in accordance with claim 1, wherein said pad biasing plate includes corner recessed areas at opposite axial corners of said plate, the recessed areas able to receive said radial retention tabs therein when said spring is mounted in said disc brake.

3. The anti-rattle spring in accordance with claim 2, wherein said loop arm extends around approximately 270°.

4. The anti-rattle spring in accordance with claim 3, wherein said axial arm includes a center notch positioned in an axial edge opposite an axial edge integral with said loop arm, said notch able to receive a base portion of the loop arm which is connected with said pad biasing plate such that a center area of the axial arm will not engage the pad biasing plate during manufacture of the spring.

5. The anti-rattle spring in accordance with claim 4, wherein said pad biasing plate biases said pad radially inwardly to prevent rattling thereof.

* * * * *